June 19, 1951  S. P. CLARK  2,557,260
VACUUM TRANSFER DEVICE
Filed Oct. 17, 1946
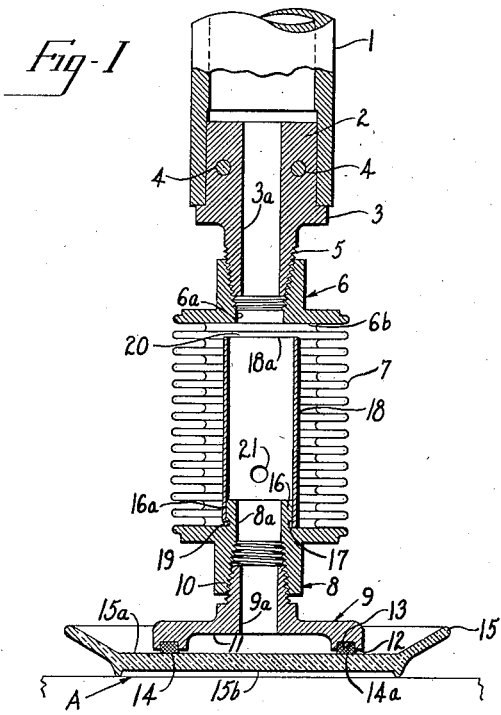
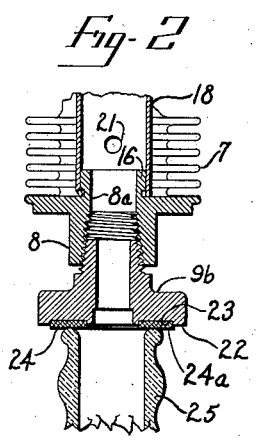
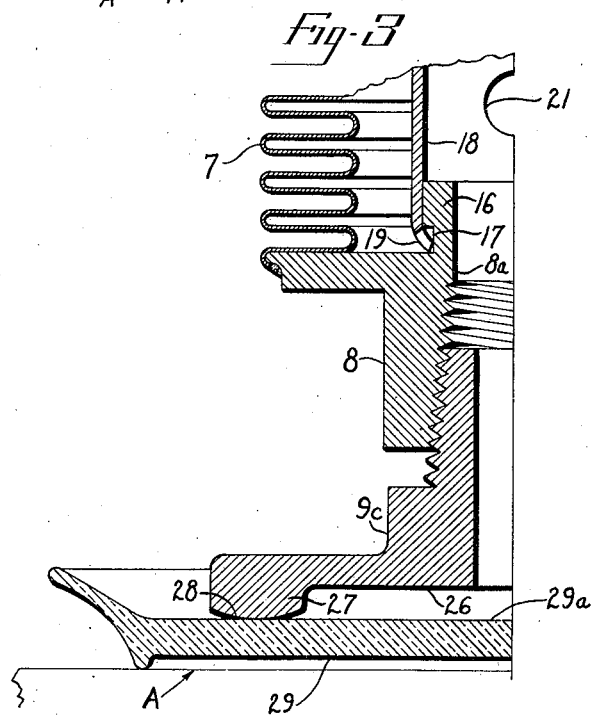
INVENTOR
STANLEY P. CLARK
BY Parham + Bates
ATTORNEYS Patented June 19, 1951

2,557,260

UNITED STATES PATENT OFFICE 2,557,260

VACUUM TRANSFER DEVICE

Stanley P. Clark, Windsor, Conn., assignor to Emhart Manufacturing Company, a corporation of Delaware Application October 17, 1946, Serial No. 703,727

3 Claims. (Cl. 294—64)

This invention relates generally to improvements in the field of transfer devices used to pick up articles and to transfer them from a receiving station to a delivery station.

It is an object of this invention to provide a transfer device for picking up and transferring a wide variety of articles of different shapes and sizes, such articles not requiring exact positioning relative to the transfer device.

A further object of the invention is to provide a transfer device which is automatically self-adjusting to compensate within substantial ranges for differences of level of articles to be transferred when they are disposed at a receiving station and for deviations from alignment in position or angularity of such articles with the transfer device.

It is a further object of this invention to provide a transfer device by which successive articles at a receiving station may be picked up satisfactorily despite angular deviations of the transfer device from a normal to the surface of the article to be transferred.

Another object of the present invention is to provide a vacuum transfer device which will function reliably despite slight irregularities of the surface of the article to be picked up and transferred.

Still another object of this invention is to provide a suction device which can be used to pick up and transfer articles at a high temperature without cooling localized regions of the articles excessively and setting up internal stresses which may cause checks and surface cracks.

A wide variety of conveying and transferring devices are known in the art and are in use at the present time. Many of these devices utilize the effects of a vacuum to hold the articles to be transferred by the transfer device. Most of the vacuum pick-up devices are incapable of satisfactory operation when the path of approach of the pick-up device to the attaching surface of the article deviates from a normal to the surface. If such a deviation should occur, many devices in current use may not seat properly on the article to be picked up and, as a consequence, the improper seating may permit a prohibitive amount of leakage past the sealing surface and thus reduce or eliminate the ability of the device to form a suction on the surface of the article.

Many devices currently used incorporate sliding tubes and telescopic arrangements to permit adjustability of the device in the direction of the axis of such tubes. If the suction members of such devices do not seat squarely on the surface of the article to be picked up, binding may occur between the telescoped tubes and a prohibitive amount of leakage may occur therebetween.

The present invention obviates the foregoing and other difficulties encountered in the use of prior vacuum transfer devices. A particular advantage of a device embodying the present invention is its ability to form a satisfactory suction on an article, even though the article be slightly displaced from the ideal receiving position or the transfer device approach the article to be transferred along a path not normal to the surface of the article on which the vacuum is to be applied.

Other advantages of the present invention will become apparent in the course of the following disclosure which is made with particular reference to the accompanying drawings, in which:

Fig. 1 is a vertical cross-sectional view of a preferred embodiment of the present invention, showing the transfer device in proper disposition to an article to be picked up;

Fig. 2 shows in cross-section a fragmentary portion of the transfer device when equipped with an alternative form of suction attaching member applied to a differently shaped article to be transferred, only a fragmentary upper end portion of the latter being shown; and Fig. 3 shows to a relatively large scale a vertical cross-section of a fragmentary portion of the transfer device when equipped with still another form of suction member.

Referring first to Fig. 1, the transfer device comprises a vertical tube 1 adapted to be clamped or otherwise secured to a mounting arm or like member (not shown) of a glassware stacker or other machine by which articles are to be transferred from a receiving station, generally indicated A, to a delivery station (not shown). Only a fragmentary lower end portion of the vertical tube 1 is shown but it will be understood that this tube in actual practice will be of suitable length, size and conformation to be operatively applied to the particular mechanism by which the transfer device of the present invention is to be supported and operated. One type of mechanism to which the present transfer device may be applied is shown in U. S. Patent No. 1,878,156 of September 20, 1932, to E. H. Lorenz, for Apparatus for Handling Glassware, and includes a vertically extending split sleeve in which the tube 1 may be clamped in lieu of the barrel 46 of the apparatus of the Lorenz patent, substantially as shown in Figs. 5, 6 and 7 of that patent.

Tube 1 is closely fitted over upper portion 2 of adapter 3 and may be attached thereto by pins 4 or by other conventional means. Adapter 3 has an externally threaded lower end portion 5 engaged with a threaded coupling flange, generally designated 6. Adapter 3 has an internal passage 3a concentric and communicating with a passage 6a passing through the center of flange 6. Attached to the periphery of flange 6 is a Sylphon or convoluted, flexible, air tight connector 7. The lower portion of Sylphon 7 is attached to an internally threaded coupling flange, generally designated 8. Sylphon 7 preferably is made of light gauge metal having considerable resiliency and may be soldered or attached by any other suitable known means to the peripheries of flanges 6 and 8. A suction flange or suction attaching member, generally designated 9, has an upper externally threaded portion 10 engaged with flange 8. Coupling flange 8 and suction flange 9 have concentric and communicating internal flow passages 8a and 9a, respectively. Suction flange 9 is formed to define a recess 11 in its lower portion and is provided with an annular, horizontal, flat face 12 at its lower extremity. A circular groove 13 is formed in annular face 12. A ring or washer 14, made from commercially available brake lining or other heat resilient material of relatively low thermal conductivity, is fitted or otherwise secured within groove 13 and projects downwardly beyond face 12. Face 14a of washer 14 is held intimately in contact with face 15a of an article 15 when the article is picked up and transferred by the transfer device.

Flange 8 is provided with a cylindrical upper portion 16 having a circumferential groove 17 at its juncture with the flange proper. A vertically positioned internal sleeve 18 is piloted on lateral surface 16a of portion 16. Sleeve 18 may be provided with a plurality of tabs 19 cut from its lower end and bent into groove 17 at spaced angular intervals to secure it to portion 16 of flange 8 or it may be fastened to the latter in any other suitable way. An annular space 20 may be present between upper extremity 18a of sleeve 18 and lower face 6b of flange 6. A hole 21 may be provided transversely through the side wall of sleeve 18 for a purpose hereinafter to be related.

The details of the attachment of sleeve 18 to flange 8 and the attachment of Sylphon 7 to the periphery of flange 8 hereinbefore described can be readily seen in the enlarged view shown in Fig. 3.

In operation, the transfer device may be used as follows. It may be lowered, as by means such as hereinbefore mentioned as being shown by the Lorenz Patent 1,878,156, the entire transfer device moving as a unit until face 14a of the washer 14 is pressed lightly against face 15a of article 15 at the receiving station. The rigid carrying member (parts 1, 3 and 6) may continue downward slightly thereafter, thereby compressing Sylphon 7 and pressing washer 14 firmly against the article. However, the downward movement of such rigid portion of the device is limited by the upper end 18a of sleeve 18 abutting against face 6b of flange 6, sleeve 18 thus forming a positive stop. Tube 1 may be evacuated internally by any suitable means (not shown), thus producing a vacuum internally in the entire transfer device and within recess 11 of suction member 9. Atmospheric pressure, acting on lower face 15b of article 15, forces the article against washer 14 and holds the article in fixed relationship thereto, the yielding qualities of washer 14 aiding in the formation of a satisfactory seal against leakage even though article 15 has slight irregularities in its face 15a. If a vacuum is maintained within the transfer device, the device and article may be raised and moved as an integral unit, and at any subsequent time article 15 may be released at a delivery station by breaking the vacuum within the transfer device by allowing air to enter therein.

Hole 21 is instrumental in equalizing the pressure conditions in the Sylphon 7 on both sides of sleeve 18. Pressure or vacuum conditions within sleeve 18 and within Sylphon 7 thus may be maintained at identical values even though the Sylphon 7 has been compressed until the upper end of the tubular stop 18 is pressed against flange surface 6b.

Shown in Fig. 2 is an alternative construction of the suction flange which makes it possible to use the above described transfer device for picking up and transferring bottles and other open mouth ware. Suction flange 9b, Fig. 2, has a lower flat horizontal face 22 provided with a broad shallow groove 23. A broad flat washer 24, made from commercial brake lining or other heat resistant material of relatively low thermal conductivity, is fitted or otherwise secured within groove 23 and projects slightly therefrom. Neck finish portion 25 of a bottle or other open mouth article at the receiving station may be contacted at its upper end surface by the washer 24 when the transfer device, including suction flange 9b, is lowered into proper position relative to the article to be picked up. As has been described hereinbefore, the yielding qualities of the washer material aids in the formation of an adequate seal on the neck finish portion of the bottle even though there are slight irregularities present therein. It is to be noted that washer 24 has a broad enough seating face 24a to seat completely on the upper end of the neck finish portion of the article despite slight displacements of the article from an ideal receiving position.

Suction flange 9c (Fig. 3) represents a variation in construction of the suction flange 9, shown in Fig. 1. Flange 9c is formed to define a recess 26 on its bottom portion surrounded by an annular shoulder or ledge 27. Annular shoulder 27 may have a curved lower face 28 substantially as shown in Fig. 3. When suction flange 9c is in working disposition to an article 29 to be picked up at receiving station A, curved face 28 will have a substantially circular line of contact with face 29a of article 29.

A slight amount of leakage may be tolerated around the sealing face of the suction attaching member without adverse effects under some conditions. However, the permissible amount of leakage is in part dependent upon the source of evacuation of the transfer mechanism and, if an evacuated source of small capacity be attached to tube 1, a relatively small amount of leakage may render the transfer device inoperative.

The ability of face 28 of suction flange 9c to seal satisfactorily on surface 29a of article 29 may be enhanced by polishing face 28 and rendering it free of nicks and other irregularities.

The washers, shown in Figs. 1 and 2, are particularly useful in reducing the rate of heat transfer from the article to the suction attaching member. Commercially available brake lining material has been found to be resistant enough to high temperatures to withstand the temperatures that may exist in articles picked up directly from a forming machine. The relatively low thermal conductivity of the brake lining material reduces the flow of heat from the sealing face of the article to be transferred to the suction attaching member, thereby minimizing the internal stresses attendant with localized cooling of the article and thus minimizing or eliminating the formation of checks and surface cracks that may result from such stresses.

Of particular importance in this invention is the provision of the flexible air tight member 7 in the transfer device. This flexible member not only makes the operation of the transfer device satisfactory and reliable despite lateral displacement of articles to be picked up but also removes the necessity for an accurate control of the angular relationship between the axis of transfer device and the surface of the article to which the device is to be secured by suction. If the transfer device should approach the surface of the article by a path deviating from a normal to the surface, flexible member 7 will flex as required to permit the sealing face on the lower portion of the transfer device to seat squarely on the surface of the article to be adhered to.

A flat plate or other article of the type shown in Fig. 1 may be displaced from the ideal receiving position by a relatively large amount without adverse effect. If suction flange 9 should be brought down upon a sloping side surface of the article, the flexibility of connecting member 7 would permit the suction flange to shift laterally until the seating face thereof rests squarely on the seating face of the article.

Many variations and modifications of the illustrative embodiments of the present invention will occur to those skilled in the art in view of the foregoing disclosure. However, I desire that my invention be limited only by the appended claims as read in the light of the prior art.

I claim:

1. A vacuum transfer device comprising a movable tubular support, a coupling flange secured to a lower portion of said movable support, a Sylphon-type flexible metallic connector having its uppermost convolution fitted to said coupling flange and secured thereto, a second coupling flange fitted to the lower end of said Sylphon connector and secured thereto, a cup-like suction attaching member operatively secured to said second named coupling flange so as to depend therefrom, and a rigid stop member mounted on said second coupling flange to extend upwardly within the Sylphon-type connector for contact with the first named coupling flange on a predetermined relative movement of said flanges toward each other from their relative positions when said connector is fully extended.

2. Apparatus as defined in claim 1 in which said suction attaching member comprises a flange having a lower portion formed to define a central recess in its bottom and further formed to provide an annular shoulder having a circular groove in its lower face extending around said recess, and a heat resistant washer of relatively low thermal conductivity disposed in said groove and projecting slightly therefrom.

3. Apparatus as defined in claim 1 in which said suction attaching member comprises a flange having a lower portion formed to define a recess of relatively large extent and further formed to provide an annular shoulder having a crowned lower face to seat on an article to be transferred on substantially line contact.

STANLEY P. CLARK.

REFERENCES CITED

The following references are of record in the file of this patent:

UNITED STATES PATENTS

| Number | Name | Date |
| --- | --- | --- |
| 1,228,690 | Monnet | June 5, 1917 |
| 1,252,280 | McDonald | Jan. 1, 1918 |
| 1,302,028 | Fuchs et al. | Apr. 29, 1919 |
| 1,426,930 | Waldron | Aug. 22, 1922 |
| 1,930,521 | Kellogg | Oct. 17, 1933 |
| 1,969,806 | Lambert | Aug. 14, 1934 |
| 2,089,714 | Schuler | Aug. 10, 1937 |
| 2,192,264 | Kallander | Mar. 5, 1940 |
| 2,394,265 | Seamans | Feb. 5, 1946 |

FOREIGN PATENTS

| Number | Country | Date |
| --- | --- | --- |
| 550,987 | France | Dec. 23, 1922 |